(12) United States Patent
Graab et al.

(10) Patent No.: US 6,815,042 B2
(45) Date of Patent: Nov. 9, 2004

(54) FLOOR COVERING

(75) Inventors: Gerhard Graab, Mannheim (DE); Klaus Heckel, Gorxheimertal (DE)

(73) Assignee: Carl Freudenberg KG, Weinheim (DE)

(*) Notice: Subject to any disclaimer, the term of this patent is extended or adjusted under 35 U.S.C. 154(b) by 317 days.

(21) Appl. No.: 10/097,171

(22) Filed: Mar. 12, 2002

(65) Prior Publication Data

US 2002/0168500 A1 Nov. 14, 2002

(30) Foreign Application Priority Data

Mar. 14, 2001 (DE) .......................................... 101 12 246

(51) Int. Cl.$^7$ .............................. B32B 5/16; B29B 11/12
(52) U.S. Cl. ........................ 428/143; 428/147; 428/148; 264/73; 264/77; 264/104
(58) Field of Search ................................ 428/141, 143, 428/147, 148, 323, 327, 402, 408, 908.8; 15/215, 238, 239, 240, 241; 296/97.23; 4/581; 238/14; 264/73, 74, 77, 104, 105

(56) References Cited

U.S. PATENT DOCUMENTS

| | | | | |
|---|---|---|---|---|
| 2,206,441 A | * | 7/1940 | Moffett et al. ............ | 156/307.1 |
| 3,386,001 A | * | 5/1968 | Slosberg et al. ............ | 361/220 |
| 4,101,689 A | * | 7/1978 | Wienand et al. ............ | 427/122 |
| 4,670,075 A | * | 6/1987 | Heckel et al. ............... | 156/222 |
| 5,154,868 A | * | 10/1992 | Heckel et al. ............... | 264/162 |
| 5,307,233 A | * | 4/1994 | Forry ......................... | 361/220 |
| 5,571,588 A | * | 11/1996 | Lussi et al. .................. | 428/46 |
| 6,221,462 B1 | * | 4/2001 | Graab et al. ................ | 428/147 |
| 6,503,424 B2 | * | 1/2003 | Graab et al. ............. | 264/37.29 |
| 6,695,999 B2 | * | 2/2004 | Kuhl et al. ................. | 264/105 |
| 6,709,732 B1 | * | 3/2004 | Graab et al. ................ | 428/143 |

FOREIGN PATENT DOCUMENTS

| | | |
|---|---|---|
| DE | 36 23 795 | 10/1987 |
| EP | 0 105 074 | 4/1988 |

* cited by examiner

*Primary Examiner*—Harold Pyon
*Assistant Examiner*—Alicia Chevalier
(74) *Attorney, Agent, or Firm*—Kenyon & Kenyon

(57) ABSTRACT

A floor covering made up of at least two layers bonded to one another, including a bottom layer (2) of electrically conductive rubber arranged under a light-colored top layer (1) of rubber, where the top layer (1) is interrupted in partial areas distributed over its area in a pattern, and formed by electrically conductive rubber there. The top layer (1) is produced from a powder (1.1) of first particles (1.2) that are light in color and made of electrically insulating rubber, as well as second particles (1.3) embedded in it, which are made of electrically conductive, at least partially vulcanized rubber. The second particles (1.3) have a diameter D, determined by screen analysis, that is at least as great as the thickness D1 of the top layer and, for practical purposes, not greater than the total of the thicknesses of the top layer and the bottom layer D2. The first (1.2) and the second (1.3) particles are pressed together and to the bottom layer (2), without pores, and bonded by vulcanization. At least one of the second particles (1.3) is present per area unit of the floor covering of 31.7 cm$^2$, with the proviso that a maximum of 50% of the total area of the floor covering is taken up by the area of the second particles (1.3).

18 Claims, 3 Drawing Sheets

FLOOR COVERING

BACKGROUND OF THE INVENTION

1. Field of the Invention

The invention relates to a floor covering made up of at least two layers bonded to one another, including a bottom layer of electrically conductive rubber arranged under a light-colored top layer of rubber, where the top layer is interrupted in partial areas distributed over its area in a pattern, and formed by electrically conductive rubber there.

2. Description of Related Art

Such a floor covering is known from European Patent 0 105 074 B1. It is made up of two contrast-colored layers of rubber, arranged one on top of the other, where the bottom layer is conductive and the top layer is not conductive. It is produced in that the material of the top layer is pre-hardened by partial vulcanization before it is pressed, and removed in the stated area regions, and subsequently placed as a layer onto the layer of softer, non-vulcanized rubber, that pressing takes place in such a way that the material of the bottom layer completely fills the area regions, and that the structure obtained in this way is permanently bonded and solidified by a subsequent vulcanization process. In this way, it can be used, in excellent manner, as a floor covering that can be widely varied with regard to the colored structure of its surface, and makes it possible to divert electrical voltages that occur on the top side, via the bottom side. However, production of such a floor covering is complicated in that removal of the top layer in the partial regions requires the use of a cutting process. This is not only expensive, furthermore it results in restrictions with regard to the geometrical structure and distribution of the partial regions.

From German Patent 36 23 795, it is known to add a fraction of hardened rubber particles with a particle size of 0.1 to 1 mm, in an amount on the order of 5 to 60 parts, to a rubber mixture, as an admixture to 100 parts, in each instance, before the mixture is hardened, in order to produce a defined bumpy surface. This imparts a good grip to a handle made of rubber, for example.

SUMMARY OF THE INVENTION

It is an object of the invention to develop a floor covering of the type stated above, in such a way that there is a better possibility of structuring the appearance of the surface in terms of design, while at the same time making it easier and more inexpensive to produce.

These and other objects of the invention are achieved by a floor covering made up of at least two layers bonded to one another, including a bottom layer (2) of electrically conductive rubber arranged under a light-colored top layer (1) of rubber, where the top layer (1) is interrupted in partial areas distributed over its area in a pattern, and only there is formed by electrically conductive rubber, wherein the top layer (1) is produced from a powder (1.1) of first particles (1.2) that are light in color and made of electrically insulating rubber, as well as second particles (1.3) embedded therein, which are made of electrically conductive, at least partially vulcanized rubber; the second particles (1.3) have a diameter D, determined by screen analysis, that is at least as great as the thickness D1 of the top layer and at most as great as the total of the thicknesses of the top layer and the bottom layer D2; the first (1.2) and the second (1.3) particles are pressed together and to the bottom layer (2), without pores, and bonded by vulcanization; and at least one of the second particles (1.3) is present per area unit of the floor covering of 31.7 $cm^2$, with the proviso that a maximum of 50% of the total area of the floor covering is taken up by the area of the second particles (1.3).

BRIEF DESCRIPTION OF THE DRAWINGS

The present invention will be described in greater detail with reference to the following drawings wherein.

DETAILED DESCRIPTION OF THE INVENTION

Figure 1:
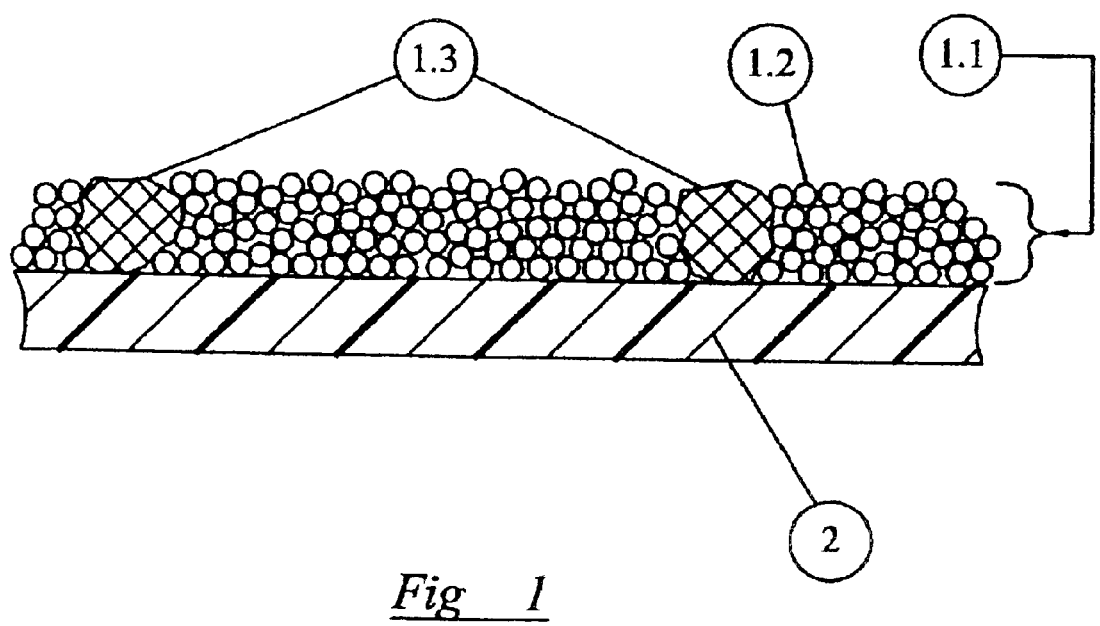
FIG. 1 shows a bottom layer of a floor covering, in longitudinal cross-section, onto which a top layer in the form of a powder of first and second particles is loosely applied.

In the floor covering according to the invention, the top layer is produced from a powder of first particles that are light in color and made of electrically insulating, non-vulcanized rubber, as well as second particles embedded in it, which are made of electrically conductive, at least partially vulcanized rubber, that the second particles have a diameter D, determined by screen analysis, that is at least as great as the thickness D1 of the top layer and at most as great as the total of the thicknesses of the top layer and the bottom layer D2 together, that the first and the second particles are pressed together with the bottom layer, without pores, and bonded by vulcanization, and that at least one or two particles is present per area unit of the floor covering of 31.7 $cm^2$, with the proviso that a maximum of 50% of the total area of the floor covering is taken up by the area of the second particles. The first and second particles are therefore made up of different rubber mixtures that are additionally present in a state of vulcanization that differs from one to the other. In addition, the first particles can have a clearly smaller diameter than the second particles, most practically a diameter that is 0.05 to 0.6 times the size of that of the second particles, thereby resulting in a relatively dense layer of the first particles when the top layer is applied to the bottom layer. In this way, it is particularly easy to predetermine the geometric structure of the finished floor covering.

The second particles can be regularly or irregularly distributed in this layer, for example in a fully regular pattern or in a statistically distributed pattern. Furthermore, they can have a completely regular structure; but they can also have an irregular structure, such as the one obtained in the course of a grinding process. In each case, the second particles have a significantly larger diameter, as compared with the first particles, causing them to project out of the surface of the structure obtained after the top layer is applied to the bottom layer.

The bottom layer of the floor covering is made up of a continuous layer of non-vulcanized or partially vulcanized rubber. It is electrically conductive, because of a sufficiently high content of an electrically conductive filler, for example a content of 5 to 25% of a highly active carbon black or graphite or a metallic powder. The second particles contained in the top layer can also have a composition in agreement with this.

To produce the ready-to-use floor covering, the top layer is applied to the bottom layer in the form of a powder of first particles that are light in color and made of electrically insulating, non-vulcanized rubber, as well as second particles embedded in it, which are made of electrically conductive, at least partially vulcanized rubber, where the second particles have a diameter D, determined by screen analysis, that is at least as great as the thickness D1 of the top layer and at most as great as the total D2 of the thicknesses of the top layer and the bottom layer of the finished floor covering, and where the amount of the second particles is sized in such a way that at least one of the second particles is present per area unit of the finished floor covering of 31.7 cm$^2$, with the proviso that a maximum of 50% of the total area is taken up by the area of the second particles, and that the first and second particles are pressed against one another and the bottom layer, without pores, and bonded by vulcanization. Because of the elastic deformability of the second particles, their diameter D can also be slightly greater than the total of the thicknesses D1 and D2 of the top layer and the bottom layer, without leaving the teaching of the invention. In general, it is permissible to exceed these values by up to 10%.

Vulcanization causes temporary liquefaction of the bottom layer of first particles used to produce the floor covering. This liquefaction proceeds continuously in the direction of the core zone, parallel to the duration of heating, proceeding from the two surface sides from which the heat required for vulcanization is introduced, and as a result, an increasing displacement of the fixation zone in the direction of the core zone of the floor covering occurs, subsequent to fixation of the surfaces of the structure. This prevents the possibility that the electrically conductive second particles might be covered, on the top, by the electrically insulating rubber of the first particles, which plasticizes later, during the production process, with the result that electrical charges that impact the surface of the ready-to-use floor covering could no longer be conducted away in the direction of the bottom layer.

In the ready-to-use floor covering, the grain edges of the first particles that decisively form the top layer and are pressed together without pores can be seen as a network structure in which the second particles are embedded. In terms of design, this is not a disruptive factor.

In an embodiment of the floor covering in which the second particles are produced from rubber that has already been completely vulcanized, it must furthermore be noted that the particles have a stronger resilience, subsequent to their removal from the vulcanization press, with reference to the zones produced from non-vulcanized first particles that surround them. This has the result that the second particles within the ready-to-use floor covering are elevated slightly above its surface, and according to the invention, this is utilized to conduct electrical charges and electrical tensions into the bottom layer of the floor covering, in particularly advantageous manner. With reference to use in areas that are at risk of explosion, this is a very particular advantage. With regard to particularly cost-effective production of the floor covering, it has proven to be advantageous if the material of the second particles and the material of the bottom layer is identical. It is therefore not absolutely necessary to use different materials for the second particles and the bottom layer.

The first and second particles can fundamentally be colored the same. However, with such a structure, it is difficult to check the electrical conductivity from the top. Within the scope of the present invention, an embodiment is therefore preferred in which the first and second particles contrast in color. Checking the electrical conductivity is therefore possible with sufficient certainty even to the eye.

The first particles can all have the same color. But again, this is not a strict requirement within the scope of the invention. The particles can therefore also include particles with different colors, or even contrast colors, if necessary. The appearance can be adapted to special requirements in this way.

The floor covering according to the invention can be particularly easily cleaned if the surface is structured to be smooth. This does not mean that the usage surface cannot be slightly corrugated or chased, in order to improve the appearance and/or slip resistance. For this purpose, all that is necessary is to use appropriately structured idling rollers or pressing tools in the device used for reciprocal pressing and heating, for example in a double-band press or platen press.

Figure 2:
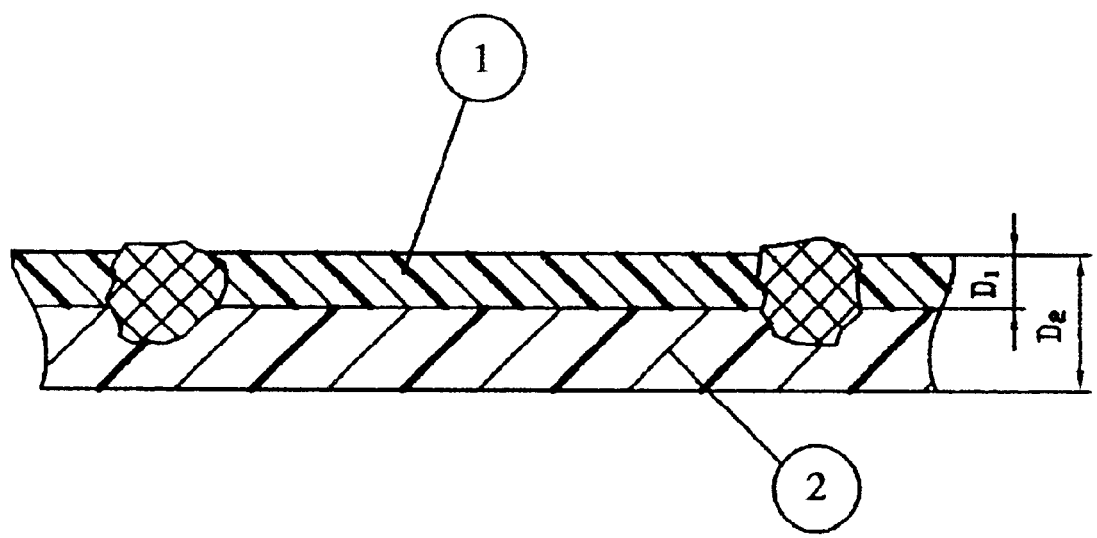
FIG. 2 shows a cut-out of a ready-to-use floor covering in longitudinal cross-section.
Figure 3:
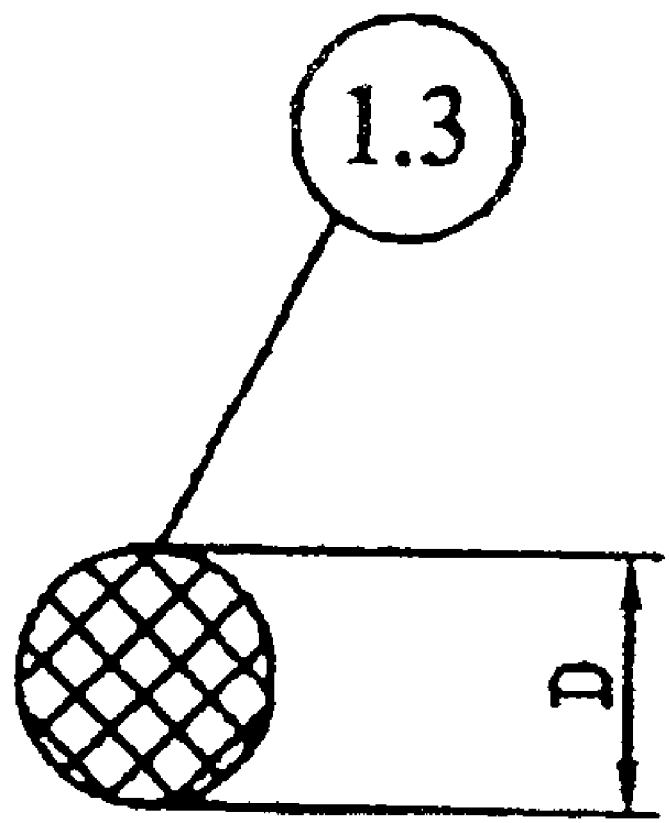
FIG. 3 shows a sample of the second particles for a determination of the diameter.

The floor covering shown in FIG. 2 is composed of two layers. This is not contrary to an invention in which top layer 1 and bottom layer 2 are bonded to a carrier layer arranged beneath them, which in turn can also be made up of a polymer material or natural material.

To produce the floor covering, it is first of all provided that the bottom layer is produced from electrically conductive material, in a first step. For this purpose, a rubber mixture with the following composition is put into a mixer and homogeneously mixed:

| | |
|---|---|
| SBR rubber | 11.8% |
| High-styrene resin (65% block styrene) | 5.6% |
| Carbon black N770 | 61.5% |
| Chalk | 14.9% |
| Plasticizer | 3.35% |
| ZnO | 0.7% |
| Stearic acid | 0.35% |
| Paraffin | 0.35% |
| Anti-aging aid | 0.2% |
| 2-mercaptobenzothiazol | 0.2% |
| Dibenzothiazyl disulfide | 0.2% |
| Sulfur | 0.85% |
| | 100.00% |

The percentage information relates to the total weight of the mixture, in each instance.

The mixture is applied to a calender, for example, after it is homogenized, and transformed into the structure of a non-vulcanized sheet with a thickness of 1 mm. This forms the bottom layer of the finished floor covering.

Subsequently, a spread covering of non-vulcanized, colored, and electrically non-conductive elastomer particles, with the following composition, is applied to the bottom layer in the form of a powder, using a metering unit. To produce it, a rubber mixture with the following composition is used:

| | |
|---|---|
| Styrene butadiene rubber with 23 wt. % styrene content | 100 parts |
| Styrene butadiene rubber with 85 wt. % styrene content | 20 parts |
| Precipitated silicic acid | 40 parts |
| Kaolin | 70 parts |
| Precipitated chalk | 30 parts |
| Cumaron-indene resin | 15 parts |
| Zinc oxide | 5 parts |
| Stearic acid | 1.5 parts |
| Sulfuric acid | 2.5 parts |
| Polyethylene glycol | 3 parts |
| Cyclohexyl benzothiazyl sulfene amide | 2.7 parts |
| Zinc dibenzyl dithiocarbamate | 0.7 parts |
| Pigments | optional |

The aforementioned composition is introduced into an internal mixer and homogeneously mixed. Subsequently, the mixture is transferred to a screw extruder that is operated at a temperature from 60 to 100° C., and the mixture is extruded through a perforated disk with bores with a diameter of 3 to 5 mm, to produce billets. The billets exiting from the perforated disk are cut off every 1 to 2 mm. As an alternative, the plasticized mass can also be allowed to exit from the slit die of a hose injection-molding head, and the product obtained in this way can be granulated in a cutting mill after it has cooled off.

The grain size distribution of the granulates is

| | |
|---|---|
| >2.5 mm | 1% |
| >2.0 mm | 33% |
| >1.4 mm | 55% |
| >1.0 mm | 25% |
| >0.71 mm | 6% |

In order to obtain granulates with different colors, the optional pigments can be used to achieve specific colors.

Of the particles obtained in this way, those that have a diameter of 0.2 to 0.8 mm are separated using the screen analysis, mixed with particles with other colors, if necessary, and applied to bottom layer 2 in such an amount that the total thickness of the floor covering, which is made up of the black bottom layer and the colored decorative layer, comes to 1.8 mm.

In a second, subsequent spreading unit, comminuted particles that are made conductive with carbon black or graphite, with a composition that corresponds to that of the bottom layer, but which have already been hardened by prior vulcanization, are spread onto the top layer in an amount that assures that in the case of statistical distribution of these conductive particles, at least one to two particles will be deposited per area unit of 31.7 cm$^2$. The second particles have a diameter that is also determined by screen analysis and is 0.7 to 0.9 mm.

The structure obtained in this way, composed of a non-vulcanized bottom layer and a powder of non-vulcanized first particles and vulcanized, electrically conductive second particles statistically distributed within it, which is applied in a layer on the bottom layer, is then transferred to a double-band press, pressed to be free of pores, and vulcanized. In this connection, the electrically conductive second particles, which cannot undergo plastic deformation, are pressed through the spread covering of non-conductive first particles, which is loose at first, and therefore they make contact with the bottom layer, because their diameter D exceeds the thickness of the top layer D1. Electrical voltages that impact the top of the ready-to-use floor covering can therefore be diverted from the top side through the second particles in the direction of the bottom layer. The effect in this regard occurs particularly reliably since the second particles have a certain resilience that has the result that after they leave the double-band press, they spring back perpendicular to the plane of the floor covering, and can project slightly above the surface of the top. This makes it possible to reliably conduct electrical charges into the bottom layer even from objects that are not entirely level, such as the bottoms of shoe soles.

The ready-to-use floor covering looks colorful, because of its construction. Its pattern does not show any particular directional orientation, in which the second particles, made of a black material, do not have a disruptive effect.

In the above example, both the first particles and the second particles have a geometrically irregular structure and are arranged in a statistical distribution. This is in keeping with modern design requirements, but does not preclude the possibility of possibly using second particles that have an identical structure and are distributed in the top layer in completely uniform manner or even according to an arbitrarily prescribed pattern. Mixed forms that contain second particles with a regular and an irregular structure are also possible.

Production of the floor covering according to the invention is possible with great cost-effectiveness. Nevertheless, this production offers an excellent possibility of making modifications in the external appearance and of adjusting the electrical conductivity to the values required in each instance.

What is claimed is:

1. A floor covering comprising: at least two layers bonded to one another, including a bottom layer of electrically conductive rubber arranged under a light-colored top layer of rubber, where the top layer has interruptions distributed over its area in a pattern, and only the interruptions are formed by electrically conductive rubber, wherein the top layer is produced from a powder of first particles that are light in color and made of electrically insulating rubber, and second particles embedded therein, which are made of electrically conductive, at least partially vulcanized rubber; the second particles have a diameter, determined by screen analysis, that is at least as great as the thickness of the top layer and at most as great as the total of the thickness of the top layer and the bottom layer; the first and the second particles are pressed together and to the bottom layer, without pores, and bonded by vulcanization; and at least one of the second particles is present per area unit of the floor covering of 31.7 cm$^2$, up to a maximum of 50% of the total area of the floor covering is taken up by the area of the second particles.

2. The floor covering according to claim 1, wherein the first particles have a smaller diameter than the second particles.

3. The floor covering according to claim 2, wherein the first particles have a diameter that is 0.05 to 0.6 times as large as the diameter of the second particles.

4. The floor covering according to claim 1, wherein the material of the second particles and the material of the bottom layer are identical.

5. The floor covering according to claim 2, wherein the material of the second particles and the material of the bottom layer are identical.

6. The floor covering according to claim 3, wherein the material of the second particles and the material of the bottom layer are identical.

7. The floor covering according to claim 1, wherein the second particles are contrast-colored relative to the first particles.

8. The floor covering according to claim 2, wherein the second particles are contrast-colored relative to the first particles.

9. The floor covering according to claim 3, wherein the second particles are contrast-colored relative to the first particles.

10. The floor covering according to claim 1, wherein the first particles include particles that are colored differently from one another.

11. The floor covering according to claim 2, wherein the first particles include particles that are colored differently from one another.

12. The floor covering according to claim 3, wherein the first particles include particles that are colored differently from one another.

13. The floor covering according to claim 1, wherein a usage surface of the top layer is slightly corrugated or chased.

14. The floor covering according to claim 2, wherein a usage surface of the top layer is slightly corrugated or chased.

15. The floor covering according to claim 3, wherein a usage surface of the top layer is slightly corrugated or chased.

16. The floor covering according to claim 1, wherein the first particles are smaller than the second particles.

17. A method for producing of a floor covering according to claim 1, in which a top layer with interruptions distributed in a pattern over its surface is applied to a continuously formed bottom layer of electrically conductive rubber, the interruptions being filled with electrically conductive rubber, and in which the layers and the rubber contained in the interruptions are bonded parallel to a vulcanization process, wherein the top layer is applied to the bottom layer in the form of a powder of first particles that are light in color and made of electrically insulating, non-vulcanized rubber, and second particles embedded in the powder, which are made of electrically conductive, at least partially vulcanized rubber, where the second particles have a diameter, determined by screen analysis, that is at least as large as the thickness of the top layer and is not greater than the total of the thickness of the top and bottom layer of the finished floor covering, and where the amount of the second particles is apportioned in such a way that at least one of the second particles is present per area unit of $cm^2$ of the finished floor covering, up to a maximum of 50% of the total area is taken up by the area of the second particles, and that the first and second particles are pressed against one another and the bottom layer, without pores, and bonded by vulcanization.

18. The method according to claim 17, wherein the powder is applied to a bottom layer of non-vulcanized or partially vulcanized rubber, and vulcanization of the rubber contained in the bottom layer is brought about at the same time with vulcanization of the rubber contained in the top layer.

* * * * *